T. B. ATTERBURY.
MANUFACTURE OF HOLLOW GLASS-WARE.
No. 183,277. Patented Oct. 17, 1876.
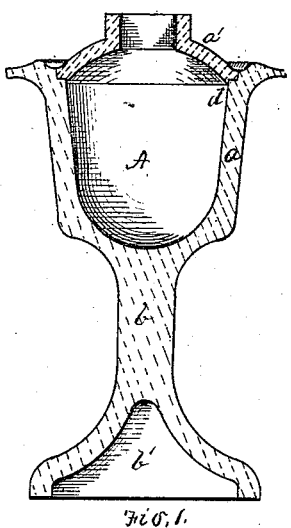
Fig. 1.
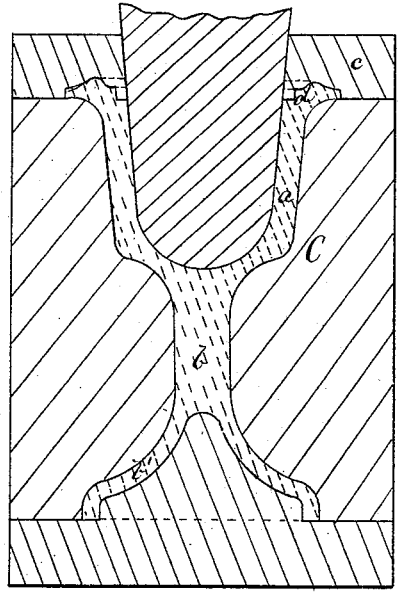
Fig. 2.
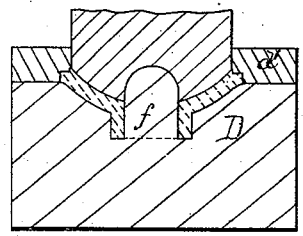
Fig. 3.
Witnesses
R. C. Wrenshall
L. C. Fitter.
Inventor
Thomas B. Atterbury
by Bakewell & Kerr
Attys.

UNITED STATES PATENT OFFICE.

THOMAS B. ATTERBURY, OF PITTSBURG, PENNSYLVANIA, ASSIGNOR TO HIMSELF AND JAMES S. ATTERBURY, OF SAME PLACE.

IMPROVEMENT IN THE MANUFACTURE OF HOLLOW GLASSWARE.

Specification forming part of Letters Patent No. 183,277, dated October 17, 1876; application filed September 23, 1876.

CASE B.

*To all whom it may concern:*

Be it known that I, THOMAS B. ATTERBURY, of Pittsburg, in the county of Allegheny and State of Pennsylvania, have invented a new and useful Improvement in the Manufacture of Hollow Glassware, (Case B;) and I do hereby declare the following to be a full, clear, and exact description thereof, reference being had to the accompanying drawing, forming part of this specification, in which—

Figure 1 is a sectional view of a lamp embodying my invention. Figs. 2 and 3 are sectional views of molds employed in forming the lamp.

Like letters refer to like parts wherever they occur.

My invention relates to the manufacture of hollow articles of glassware having contracted openings, such as lamps, vases, pitchers, and like articles; and it consists in pressing the article in sections, some of which have "marees" or offsets, and then joining the pressed sections by means of cement, so as to complete the article designed.

Heretofore, in the manufacture of hollow articles of glassware having constricted orifices which would not permit the withdrawal of a plunger, one method has been to press the article in the nearest practical form to that of the desired article, which would admit of being made by a plunger, and then to reheat, close in, and shape the article by hand. This method requires skilled labor to give anything like uniform results, and adds greatly to the cost of manufacture. It also is objectionable, in that irregular forms and designs cannot be readily produced.

Another method, and that commonly practised, is by blowing the article in a mold, but articles thus produced have not the strength or durability of pressed ware.

I will now proceed to describe my invention, so that others skilled in the art to which it appertains may apply the same.

Having determined the shape to be given to the article—as, for instance, a lamp—I divide it up into the smallest number of symmetrical sections, which will give parts of such general shape as can be formed by a mold and plunger. Some of these sections, determined by the position they occupy in the article, I form with marees or offsetts, in order that the parts may be regularly and evenly united. I next construct molds and plungers in accordance with the shapes to be produced, and proceed to press up the several sections in the usual manner, after which said sections may be put together and secured by means of soluble glass or like well-known cements.

In the drawing, A indicates a lamp formed in accordance with this invention, composed of two sections, $a$ $a'$. The section $a$ may be provided with a foot and stem, $b$ $b'$, and in that case will be pressed in a sectional mold, C, having a ring, $c$, which is so shaped as to leave a maree or offset, $d$, in the section $a$; and, if desired, a drip-flange, $e$, may likewise be formed on section $a$, as shown. The upper section $a'$ is pressed in a mold, D, having a central peg, $f$, for forming the collar-orifice. The sections $a$ $a'$ being formed by pressure in molds, as before specified, are subsequently jointed by soluble glass or similar cement.

The advantages arising from my invention are that a durable pressed-glass hollow article, of neat appearance, can be produced by unskilled labor, and at greatly reduced cost.

Having thus described my invention, what I claim, and desire to secure by Letters Patent, is—

The hollow article of glassware, herein described, composed of pressed sections, having marees or offsets upon the receiving sections, and united by cement, substantially as and for the purpose specified.

In testimony whereof I, the said THOMAS B. ATTERBURY, have hereunto set my hand.

THOMAS B. ATTERBURY.

Witnesses:
F. W. RITTER, Jr.,
JAMES I. KAY.